Patented June 19, 1923.

1,459,703

UNITED STATES PATENT OFFICE.

HERMANN WIEDERHOLD AND CARL EHRENBERG, OF FURSTENWALDE-ON-THE-ODER, GERMANY, ASSIGNORS TO INDUSTRIAL RESEARCH LIMITED, OF LONDON, ENGLAND, A BRITISH COMPANY.

RECOVERY OF AMMONIA FROM GASES CONTAINING THE SAME.

No Drawing.   Application filed March 5, 1923.   Serial No. 623,011.

*To all whom it may concern:*

Be it known that we, HERMANN WIEDERHOLD and CARL EHRENBERG, citizens of the Republic of Germany, and residents, respectively, of Furstenwalde-on-the-Oder, Germany, and Furstenwalde-on-the-Oder, Germany, have invented certain new and useful Improvements in the Recovery of Ammonia from Gases Containing the Same, of which the following is a specification.

This invention is for improvements in and relating to the recovery of ammonia from gases containing the same, and has particular reference to the treatment of such gases of poor ammoniacal content.

According to this invention, the improved process for the recovery of ammonia from ammonia-containing gases is characterized by bringing the gas into contact with crude carbonaceous material containing organic acidic bodies, such, for example, as soft lignite or peat.

The gases may be passed through a scrubber charged with lignite in an appropriate state of disintegration.

The ammonia absorbed by the carbonaceous material may be recovered therefrom by treatment of the latter with a suitable alkali, such for example as lime, or slaked lime.

After removal of the absorbed ammonia from the lignite or the like, the latter may be treated with a suitable mineral acid, such as hydrochloric acid, in slight excess, to liberate organic acids combined with the lime, so that the latter can then be re-utilized for the treatment of further ammonia-containing gases.

Alternatively, the lignite or the like which has absorbed the ammonia may be directly employed as a fertilizer.

The invention may be applied in conjunction with the use of peat, lignite or the like in the preparation of producer-gas with low-temperature tar production.

The invention permits of the ready recovery of ammonia from ammoniacal gases with avoidance of the wear and tear on the plant frequently experienced in the use of sulphuric acid as absorbent, apart from the economy effected by enabling the comparatively expensive sulphuric acid ordinarily employed to be dispensed with. According to this invention the ammonia is brought into chemical combination with a body which does not attack the generating plant, and the waste material is applicable for re-use in the treatment of more gas.

The invention has shown itself to be particularly adaptable to the recovery of ammonia from gases weak in the same, such as weakly ammoniacal distillation gases and producer gas, which it has hitherto been found commercially impracticable to treat for the recovery of the ammonia.

What we claim as our invention and desire to secure by Letters Patent is:—

1. A process for the treatment of ammoniacal gases for the purpose described, which consists in bringing the gas in contact with crude carbonaceous material containing the organic acidic bodies, recovering the ammonia absorbed by the crude carbonaceous material by treating the latter with an ammonia liberating alkali, thereafter further treating the carbonaceous material with a mineral acid in slight excess to liberate the organic acids combined with the alkali, and reutilizing the latter for the treatment of further ammonia containing gases.

2. A process for the treatment of ammoniacal gases for the purpose described, which consists in bringing the gas into contact with lignite, recovering the ammonia absorbed by the lignite by a lime treatment of the latter, thereafter treating the lignite with hydrochloric acid in slight excess to liberate the organic acids combined with the lime, and reutilizing the latter for the treatment of further ammonia containing gases.

In testimony whereof we have signed our names to this specification.

HERMANN WIEDERHOLD.
CARL EHRENBERG.